United States Patent [19]

Mendy et al.

[11] Patent Number: 4,701,469

[45] Date of Patent: * Oct. 20, 1987

[54] TRIGLYCERIDES, PROCESS FOR THERAPEUTICAL APPLICATIONS AND COMPOSITIONS CONTAINING THEM

[75] Inventors: Francois Mendy, Boulogne; Pierre Barthelemy, Barbery, both of France

[73] Assignee: Roussel Uclaf, Paris, France

[ * ] Notice: The portion of the term of this patent subsequent to Aug. 19, 2003 has been disclaimed.

[21] Appl. No.: 866,258

[22] Filed: May 23, 1986

Related U.S. Application Data

[63] Continuation of Ser. No. 485,408, Apr. 15, 1983, Pat. No. 4,607,052.

[51] Int. Cl.$^4$ .......................... C11C 3/02; A61K 31/23
[52] U.S. Cl. .................................. 514/547; 260/410.7
[58] Field of Search ...................... 514/547; 260/410.7

[56] References Cited

U.S. PATENT DOCUMENTS

| | | | |
|---|---|---|---|
| 3,082,228 | 3/1963 | Sutherland | 260/420 |
| 3,988,446 | 10/1976 | Paris et al. | 260/410.7 |
| 4,172,086 | 10/1979 | Berkowitz | 260/406 |
| 4,438,106 | 3/1984 | Wagu et al. | 514/547 |

FOREIGN PATENT DOCUMENTS

| | | | |
|---|---|---|---|
| 2513174 | 4/1983 | France | 260/410.7 |
| 2033745 | 5/1980 | United Kingdom . | |
| 2090529 | 7/1982 | United Kingdom . | |
| 2098065 | 11/1982 | United Kingdom . | |

*Primary Examiner*—Anton H. Sutto
*Attorney, Agent, or Firm*—Bacon & Thomas

[57] ABSTRACT

The present invention concerns new triglycerides of Formula I:

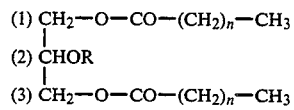

wherein R represents an acyl fragment of a polyunsaturated fatty acid containing 18 to 22 carbon atoms, the acyl fragment being capable of being oxidized, however, R cannot represent the acyl fragment of eicosatetrayn-5, 8, 11, 14-oic acid, and wherein n represents an integer varying from 2 to 16; a process for their preparation, their dietetic and therapeutic applications and compositions containing them.

6 Claims, No Drawings

TRIGLYCERIDES, PROCESS FOR THERAPEUTICAL APPLICATIONS AND COMPOSITIONS CONTAINING THEM

This application is a continuation of application Ser. No. 485,405, filed Apr. 15, 1983, now U.S. Pat. No. 4,607,052 issued Aug. 19, 1986.

The present invention concerns new triglycerides, a process for their preparation, their dietetic and therapeutic applications and compositions containing them.

The object of the present invention comprises products of General Formula I:

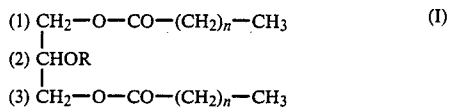

wherein R represents an acyl fragment of a polyunsaturated fatty acid containing 18 to 22 carbon atoms, the acyl fragment being capable of being oxidized, however, R cannot represent the acyl fragment of eicosatetrayn-5, 8, 11, 14-oic acid, and wherein n represents an integer varying from 2 to 16.

Fatty acid triglycerides with a medium chain containing 2 to 12 carbon atoms are mentioned in Special Medicine Pat. No. 3 598 as substances capable of improving the absorption of fatty materials. Furthermore, triglycerides of polyunsaturated fatty acids are described in other patents. In particular, in FR No. 2 426 461, the triglyceride of eicosapentaene 5, 8, 11, 14, 17-oic acid is indicated for the treatment of thromboembolic problems. However, the triglyceride of a polyunsaturated fatty acid is a form which does not provide good absorption in the body of the polyunsaturated fatty acid.

In particular, because the triglycerides of eicosapentaenoic acid in position (1) are poorly hydrolyzed by the pancreatic lipases, synthetic triglycerides of eicosapentaeonic acid or docosahexanoic acid do not lead necessarily to a monoglyceride in position (2), [Nestor R. BOTTINO, Lipids, 1967, 2 (6)]. Further, it is well known that monoglycerides in position (2) constitute the form best absorbed by the human body.

It has therefore been of great interest to have available products capable of introducing such monoglycerides in to the body. It has been found that certain triglycerides of a definite structure, specifically those readily hydrolyzed in positions 1 and 3 by enzymes of the digestive tract, satisfy this objective. For this reason, the object of the present invention consists of triglycerides of Formula I which have the property of readily releasing the monoglyceride in position (2) by the action of the pancreatic lipase.

In effect, this enzyme hydrolyses the medium chain fatty acids esterifying the positions 1 and 3 of glycerol and thus set free the monoglyceride in position (2). As man does not have an intestinal monoglyceride lipase acting of position (2), the polyunsaturated fatty acid attached in position (2) of a glycerol is much better protected in the intestinal environment and is never released in this stage. Triglycerides, such as those defined in Formula I effect a much better absorption of monoglyceride of position (2) and in this manner make it possible for the body to utilize the polyunsaturated fatty acid carried by the monoglyceride under better conditions.

Furthermore, due to the improved absorption of the monoglyceride of position (2) which they release, the triglycerides of the invention may be used in lower therapeutical doses than the conventional synthetic triglycerides. Further, on a galenic level, the triglycerides of Formula I have another advantage. In effect, polyunsaturated fatty acids are easily degraded, thereby becoming malodorous and difficult to use. The triglycerides of the invention have a stability which permits the elimination of this disadvantage, thus presenting a form well suited to the administration of a polyunsaturated fatty acid.

The triglycerides which are the object of the invention more particularly include the products of Formula I as defined hereinabove, characterized in that the oxidized acyl fragments are hydroxylated, epoxidized, hydroperoxidized, hydroxyepoxidized fragments.

The oxidized acyl fragments may be, for example, hydroxylated fragments of fatty acids, such as the following acids:
15-OH eicosatetraene-5, 8, 11, 13-oic,
12-OH eicosatetraene-5, 8, 10, 14-oic,
11-OH eicosatetraene-5, 8, 12, 14-oic,
8-OH eicosatetraene-5, 9, 11, 14-oic,
9-OH eicosatetraene-5, 7, 11, 14-oic,
5-OH eicosatetraene-6, 8, 11, 14-oic,
12-OH eicosapentaene-5, 8, 10, 14, 17-oic,
15-OH eicosapentaene-5, 8, 11, 13, 17-oic.

Further, triglycerides conforming to Formula I hereinabove characterized in that in Formula I, n represents an integer number varying from 2 to 10, and more particularly triglycerides characterized in that n is equal to 2, 4, 6 or preparation, characterized in that dihydroxyacetone is esterified with two molar equivalents of a functional derivative of an acid of Formula II:

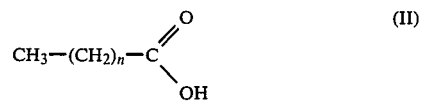

wherein n is defined as previously,
thereby obtaining a product of Formula III:

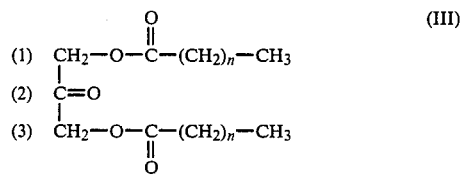

which is treated with a reducing agent that will not cause the saponification of the ester groups, thus obtaining a product of Formula IV:

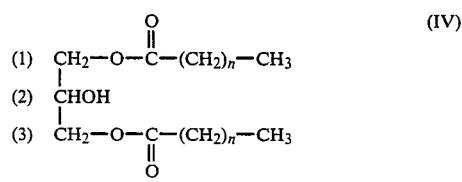

which is esterified with a functional derivative of a polyunsaturated fatty acid, this acid having the formula R—OH, R having the same significance as that indicated hereinabove, to obtain a triglyceride of Formula I, which is oxidized, alternatively, in the case where R is an unoxidized acyl fragment, by the action of lipoxygenases or by simple oxidation, 10 are preferred.

The above cited values of n correspond respectively to the butyryl, hexanoyl, octanoyl, dodecanoyl radicals.

Further, particular triglycerides are those in which R represents a nonoxidized acyl fragment of a polyunsaturated fatty acid, with R being essentially the acyl fragment of one of the following polyunsaturated fatty acids:

| α-linolenic acid | $C_{18}$: 3, ω3 |
| --- | --- |
| γ-linolenic acid | $C_{18}$: 3 ω6 |
| stearidonic acid | $C_{18}$: 4, ω3 |
| dihomo γ-linolenic acid | $C_{20}$: 3, ω6 |
| dihomo α-linolenic acid | $C_{20}$: 3, ω3 |
| eicosatetraenoic acid | $C_{20}$: 4 ω3 |
| arachidonic acid | $C_{20}$: 4 ω6 |
| eicosapentaenoic acid | $C_{20}$: 5, ω3 |
| docosatetraenoic acid | $C_{22}$: 4, ω6 |
| docosapentaenoic acid | $C_{22}$: 5, ω6 |
| docosahexaenoic acid | $C_{22}$: 6, ω3 |
| docosapentaenoic acid | $C_{22}$: 5, 3 | and most particularly the following triglycerides are included: -1,3-dioctanoyl eicosapentaenoyl glycerol of the formula:

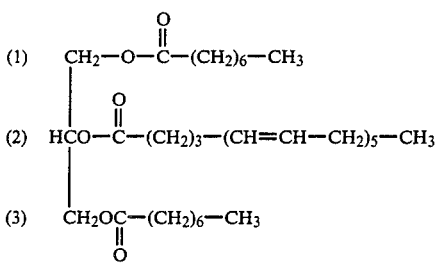

A further object of the present invention is a process of to obtain the product of Formula I, where, R is an oxidized acetyl fragment.

Under the preferred conditions, the abovedescribed process is effected in the following manner:

the functional derivative of the acid of Formula II preferably is the chloride of the acid. The anhydride, a mixed anhydride, or an active ester may also be used, the esterification is effected conveniently in the presence of a tertiary base, such as pyridine or triethylamine. The reaction is carried out in a chlorinated solvent such as dichloromethane, dichloroethane, chloroform, carbon tetrachloride. Solvents such as dimethylformamide or dimethylacetamide may also be used, the reduction of the ketone function in position 2 of the product of Formula III is characterized in that the reducing agent which does not cause saponification of ester groups, is a borohydride of an alkaline metal such as sodium or potassium borohydride acting in an alcohol medium, wherein the alcohol may be methanol, ethanol or propanol, the reduction is effected with a controlled pH value, specifically with the pH maintained at values between 6.5 and 7.5, the functional derivative of the polyunsaturated fatty acid of the formula R—OH is preferably the chloride of the acid, with the anhydride, a mixed anhydride, an active ester also being suitable, the esterification of the product of Formula IV is effected under preferred conditions identical with those mentioned hereinabove for the esterification of dihydroxyacetone, the chemical oxidation of the triglycerides of Formula I in which R is a nonoxidized acyl fragment, may comprise, for example, of self-oxidation by simple aging or of oxidation obtained by the action of hyperbaric oxygen, hydrogen peroxide or oxidizing acids, such as metachloroperbenzoic acid.

Biochemical oxidation may be effected for example with the aid of enzymes, such as lipoxygenases or the enzymes of the α-, β- or ω-oxidation of fatty acids.

The functional derivatives of acids of Formula II and of the polyunsaturated fatty acids of Formula R—OH are prepared by methods known in themselves.

The oxidized polyunsaturated fatty acids may be obtained by chemical or biochemical oxidation, such as mentioned hereinabove, from nonoxidized polyunsaturated fatty acids.

The products of the invention have interesting pharmacological properties. Firstly, they posess the characteristic activity of the polyunsaturated fatty acid, attached in position 2. Thus, the products of the invention exhibit the following properties:

the activity of the precursor of the prostaglandin type derivatives, the activity of the precursor of the hydroxylated fatty acids, the activity of the precursor of leucotriene type substances.

These properties are more or less pronounced depending on the polyunsaturated fatty acid considered. The triglycerides of Formula I carrying an acyl derivative of a hydroxylated, epoxidized, hydroperoxidized or hydroxyepoxidized polyunsaturated fatty acid further possess:

anti-aggregating properties by direct or indirect effect (by inhibition of the synthesis of prostaglandins of Family 2);

immuno-modulating properties.

With respect to the polyunsaturated fatty acid itself, the products according to the invention have the essential advantages of better stability and excellent absorption in the digestive tract.

The products which are the object of the present application find applications in every case where it is desired to provide the organism with a polyunsaturated fatty acid in polyunsaturated fatty acid deficiency situations, such as, for example, in the case of lipid digestion problems, metabolic diseases or in the case of aging. In this type of situation, there is frequently observed an increased need of the body for a specific polyunsaturated fatty acid and the administration of the products of the invention satisfies this need.

The application of the triglycerides defined hereinabove is a further object of the invention; these applications include use as nutrients or nutritional supplements responding to specific nutritional needs.

For example, among the polyunsaturated fatty acids which may be administered by means of the triglycerides according to the invention to the nutritionally deficient body, the following polyunsaturated fatty acids may be mentioned:

| γ-linolenic acid | $C_{18}$: 3, ω6 |
| --- | --- |
| stearidonic acid | $C_{18}$: 4, ω3 |
| dihomo γ-linolenic acid | $C_{20}$: 3, ω6 |
| arachidonic acid | $C_{20}$: 4, ω6 |

| -continued | |
|---|---|
| eicosapentanoic acid | $C_{20}: 5, \omega 3$ |
| docosahexanoic acid | $C_{20}: 6, \omega 3$ |

Generally in such situations, the administration by intravenous means of fatty acids does not permit the elimination of the reduction of their proportion and this is particularly true in nutritionally deficient alcoholic or cirrhotic cases.

For this reason, a further object of the invention consists of therapeutic nutritional products containing one of the abovedefined triglycerides, possibly in combination with a neutral vehicle suitable for oral, enteral or parenteral administration.

A still further object of the invention is the application as medicines of the abovedefined triglycerides.

Specifically, the invention has as its object as a medicine:
1,3-dioctanoyl-2-eicosapentaenoyl glycerol.

The abovedefined products constitute according to the invention certain highly useful medicines in human therapeutics, in particular for the treatment of lipid digestion problems, metabolic diseases, cases of nutritional deficiencies in alcoholic and cirrhotic patients, artherosclerosis, hypertension, platelet hyperaggregation, cerebral senescence and in conditions where immunomodulation is desired. In the latter case, the products of the invention are used, for example, in the treatment of autoimmune diseases, such as rheumatoid polyarthritis, erythematous lupus, pemphigus or hemolytic anemia or the prevention of the rejection of transplanted organs or implants or in the treatment of certain reactions of the hyperinflammatory or allergic type, inflammatory bronchial syndromes or constrictive bronchopathias, such as asthma.

The usual dose, which is variable depending on the product used and the infirmity involved, may range, for example, between 50 mg and 6 g per day for adults orally and preferably for 1,3-dioctanoyl eicosapentaenoyl glycerol, between 140 mg and 300 mg per day.

The present invention also has as its object pharmaceutical compositions containing as the active ingredient a medicine as described above. These compositions are prepared so that they may be administered in a digestive or parenteral manner. They may be solid or liquid and may be provided in the pharmaceutical forms presently used in human medicine, for example, simple or coated tablets, gel capsules, granules, suppositories, injectable preparations; they are prepared by conventional methods.

The active ingredient or ingredients may be incorporated into vehicles usually employed in pharmaceutical compositions, such as talc, gum arabic, lactose, starch, magnesium stearate, cocoa butter, aqueous or nonaqueous vehicles, fatty bodies of animal or vegetable origin, paraffin derivatives, glycols, various wetting, dispersing or emulsifying agents, preservatives.

The examples given hereinbelow will illustrate the invention without limiting it.

EXAMPLE 1

1,3-dioctanoyl eicosapentaenoyl glycerol

Stage a 1,3-dioctanoyl dihydroxyacetone

Under agitation, 22.125 g dihydroxyacetone and 187.5 cm³ dichloroethane are mixed together and heated with reflux for 10 min. 60.5 cm³ pyridine are added and then drop by drop 119.75 g octanoyl chloride and 187.5 cm³ dichloroethane are added; the mixture is allowed to cool to the ambient temperature over 2 h. The pyridine chlorohydrate formed is eliminated by filtration, the filtrate is washed with distilled water and then with a 5% aqueous solution of sodium bicarbonate and again with distilled water, until a final pH of 5.2 is obtained, whereupon the organic solution is dried. The solvent is eliminated under reduced pressure and a viscous residue is obtained, which is recrystallized in ethyl acetate, yielding 60.16 g of the product expected. (Mp=60° C.).

Analysis: $C_{19}H_{34}O_5$:
Calculated: C% 66.63 H% 10.01.
Determined: 66.9 10.1.

Stage b 1,3-dioctanoyl glycerol

Under agitation at 25° C., 30 g of the product obtained in the preceding stage are dissolved in 1500 cm³ ethyl alcohol. The pH of the solution is adjusted to 5.4 by the addition of 0.6 cm³ of a ½ aqueous solution of acetic acid. Then, in 15 min, 8.55 g sodium borohydrate are added, with the pH being maintained less than or equal to 7.5 by the addition of acetic acid, diluted ½. The solvent is eliminated under reduced pressure, the residue taken up with dichloroethane and distilled water. The organic phase is separated by decantation, washed with distilled water, dried and the solvent eliminated under reduced pressure, whereupon 30.19 g of the product expected are obtained (Mp=26° C.).

Analysis:
Calculated: C% 66.24 H% 10.53.
Determined: 66.2 10.6.

Stage c 1,3-dioctanoyl eicosapenta glycerol 1.35 g of the product obtained in the preceding stage are dissolved in 1.8 cm³ dichloroethane, together with 0.256 cm3 pyridine, then drop by drop, at the ambient temperature, 1 g eicosapentaenoyl and 1.8 cm³ dichloroethane are added. The solution is agitated for 20 min at the ambient temperature, allowed to stand overnight at +5° C., the pyridine chlorohydrate formed eliminated by filtration and the filtrate evaporated under reduced pressure. The residue is taken up with 14.9 cm³ cyclohexane, washed with 2.98 cm³ of a mixture (1/1) of 0.1 N sodium hydroxide and ethanol, the organic phase separated, washed to a pH of 7.3 with 2.98 cm³ of a (1/5/5) mixture of 0.1N sodium hydroxide - ethanol - water, the with a (1/1) mixture of water and ethanol, to a pH of 5.4, solvent of the organic phase eliminated under reduced pressure and 2.07 g of a product, which is chromatographed on silica and yields 669 mg of the product expected.

Analysis: $C_{39}H_{64}O_6$:
Calculated: C% 74.48 H% 10.26.
Determined: 73.0 10.0.

RMN spectrum

The RMN spectrum was established in deuterochloroform; it confirms the structure of the product.

EXAMPLE 2

Gel capsules of the following formula are prepared:
1,3-dioctanoyl eicosapentaenoyl glycerol: 100 m vehicle q.s.p: 300 mg.
(Details of the vehicle: kaolin, corn starch, avicel, magnesium stearate, talcum, aerosil).

EXAMPLE 3

Soft capsules of the following formula were prepared:
1,3-dioctanoyl eicosapentaenoyl glycerol: 200 mg
vehicle for one soft capsule q.s.p.: 1 capsule.

EXAMPLE 4

An emulsion for intravenous injection of the following formula is prepared:
1,3-dioctanoyl eicosapentaenoyl glycerol: 10 g
DL α-tocopherol acetate 0.3 g
soy lecithin 1.2 g
N glycerin 1.8 g
distilled water q.s.q.: 100 ml.

Clinical study

Eleven patients, six platelet hyper-aggregants and five normo-aggregants received daily and orally 160 mg 1,3-dioctanoyl 20eicopentaenoyl glycerol for 1 month.

The coefficients of platelet aggregation were calculated before and after treatment by the method of Ph. DARCET, published in Ann. Nutr. Alim. 1980 34 277-290.

After one month of the treatment, it appears that the modifications of platelet aggregation in normo-aggregants are very slight, while the amplitude of variations is very high in the platelet hyper-aggregants. Following the treatment it is found that four of the six platelet hyper-aggregants had a nearly normal platelet aggregation coefficient and one patient only did not have a satisfactory aggregation coefficient.

We claim:
1. Triglycerides of formula (I):

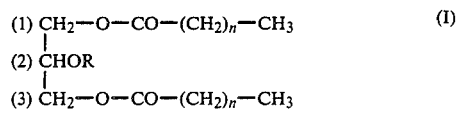

wherein R represents a nonoxidized acyl fragment of a polyunsaturated fatty acid containing 18 to 22 carbon atoms, and wherein the unsaturation is due to double bonds, and n is 6.

2. A triglyceride as claimed in claim 1 wherein R represents an acyl fragment of gamma-linolenic acid.

3. A triglyceride as claimed in claim 1 wherein R is the acyl fragment of arachidonic acid.

4. A method of treating a patient having trouble digesting, lipids, metabolic diseases, or undernutrition which comprises administering to the patient an effective amount of the compound of claim 1.

5. Therapeutical nutrition products containing one of the triglycerides as defined in claim 1, in possible combination with a neutral vehicle suitable for oral, enteral or parental administration.

6. Pharmaceutical compositions containing as the active ingredient a medicine according to claim 1.

* * * * *